United States Patent
Choi et al.

(10) Patent No.: US 11,677,112 B2
(45) Date of Patent: Jun. 13, 2023

(54) METAL-AIR BATTERY AND METHOD OF MANUFACTURING THE METAL-AIR BATTERY

(71) Applicant: Samsung Electronics Co., Ltd., Suwon-si (KR)

(72) Inventors: Wonsung Choi, Hwaseong-si (KR); Hyunjin Kim, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 267 days.

(21) Appl. No.: 17/017,913

(22) Filed: Sep. 11, 2020

(65) Prior Publication Data

US 2021/0167449 A1    Jun. 3, 2021

(30) Foreign Application Priority Data

Nov. 29, 2019    (KR) .................. 10-2019-0157677

(51) Int. Cl.
| | |
|---|---|
| *H01M 12/08* | (2006.01) |
| *H01M 4/90* | (2006.01) |
| *H01M 4/86* | (2006.01) |

(52) U.S. Cl.
CPC ......... *H01M 12/08* (2013.01); *H01M 4/8668* (2013.01); *H01M 4/9016* (2013.01); *H01M 4/8605* (2013.01); *H01M 2300/0068* (2013.01); *H01M 2300/0071* (2013.01)

(58) Field of Classification Search
CPC .... H01M 12/08; H01M 12/06; H01M 4/8668; H01M 4/9016; H01M 4/8605; H01M 2300/0068; H01M 2300/0071; H01M 4/86–98

See application file for complete search history.

(56) References Cited

U.S. PATENT DOCUMENTS

| | | | |
|---|---|---|---|
| 9,225,036 B2 | 12/2015 | Chang et al. | |
| 2010/0055531 A1* | 3/2010 | Ohmori ............... | H01M 8/2483 29/623.2 |
| 2013/0260265 A1* | 10/2013 | Shimizu ............... | H01M 12/08 429/405 |
| 2014/0349203 A1 | 11/2014 | Klose-Schubert et al. | |

(Continued)

FOREIGN PATENT DOCUMENTS

| | | |
|---|---|---|
| JP | 2011243324 A | 12/2011 |
| JP | 2017111954 A | 6/2017 |

(Continued)

OTHER PUBLICATIONS

MSDS sheet for titanium dioxide: https://beta-static.fishersci.com/content/dam/fishersci/en_US/documents/programs/education/regulatory-documents/sds/chemicals/chemicals-t/S25818.pdf (Year: 2014).*

(Continued)

*Primary Examiner* — Eugenia Wang
(74) *Attorney, Agent, or Firm* — Cantor Colburn LLP

(57) ABSTRACT

A metal-air battery includes an anode layer including a metal, a cathode layer including an electrically conductive metal oxide, a solid electrolyte layer between the anode layer and the cathode layer, and a bonding layer including a metal, where the bonding layer is disposed between the cathode layer and the solid electrolyte layer.

18 Claims, 11 Drawing Sheets

(56) References Cited

U.S. PATENT DOCUMENTS

| | | | |
|---|---|---|---|
| 2015/0340704 A1* | 11/2015 | Ishikawa | H01M 12/08 |
| | | | 429/405 |
| 2016/0064785 A1 | 3/2016 | Kim et al. | |
| 2017/0222287 A1* | 8/2017 | Suzuki | H01M 12/08 |
| 2017/0358834 A1 | 12/2017 | Cho et al. | |
| 2018/0114977 A1 | 4/2018 | Sakamoto et al. | |
| 2018/0248189 A1* | 8/2018 | Pan | H01M 10/0525 |
| 2019/0044186 A1 | 2/2019 | Kim et al. | |
| 2020/0212451 A1 | 7/2020 | Kim et al. | |

FOREIGN PATENT DOCUMENTS

| | | | |
|---|---|---|---|
| JP | 2017183285 A | 10/2017 | |
| KR | 1020100116141 A | 10/2010 | |
| KR | 1020160090119 A | 7/2016 | |
| KR | 120170071236 A | 6/2017 | |
| KR | 1020190015134 A | 2/2019 | |

OTHER PUBLICATIONS

MSDS sheet for nickel: https://www-s.nist.gov/m-srmors/msds/986-MSDS.pdf (Year: 2014).*

MSDS sheet for platinum (platinum black): https://www.fishersci.com/store/msds?partNumber=AC195210050&productDescription=PLATINUM+BLACK+98%25+PT+5GR&vendorId=VN00032119&countryCode=US&language=en (Year: 2021).*

Extendedd EP search Report dated Apr. 26, 2021 of EP App. No. 20209270.6.

Jake Christensen et al., "A Critical Review of Li/Air Batteries," Journal of The Electrochemical Society, Publised Dec. 29, 2011, pp. R1-R30, vol. 159, Issue 2.

Zhao et al., "Carbon and binder free rechargeable Li—O2 battery cathode with Pt/Co3O4 flake arrays as catalyst", Journal of Power Sources, 248, 2014, pp. 1270-1274.

* cited by examiner

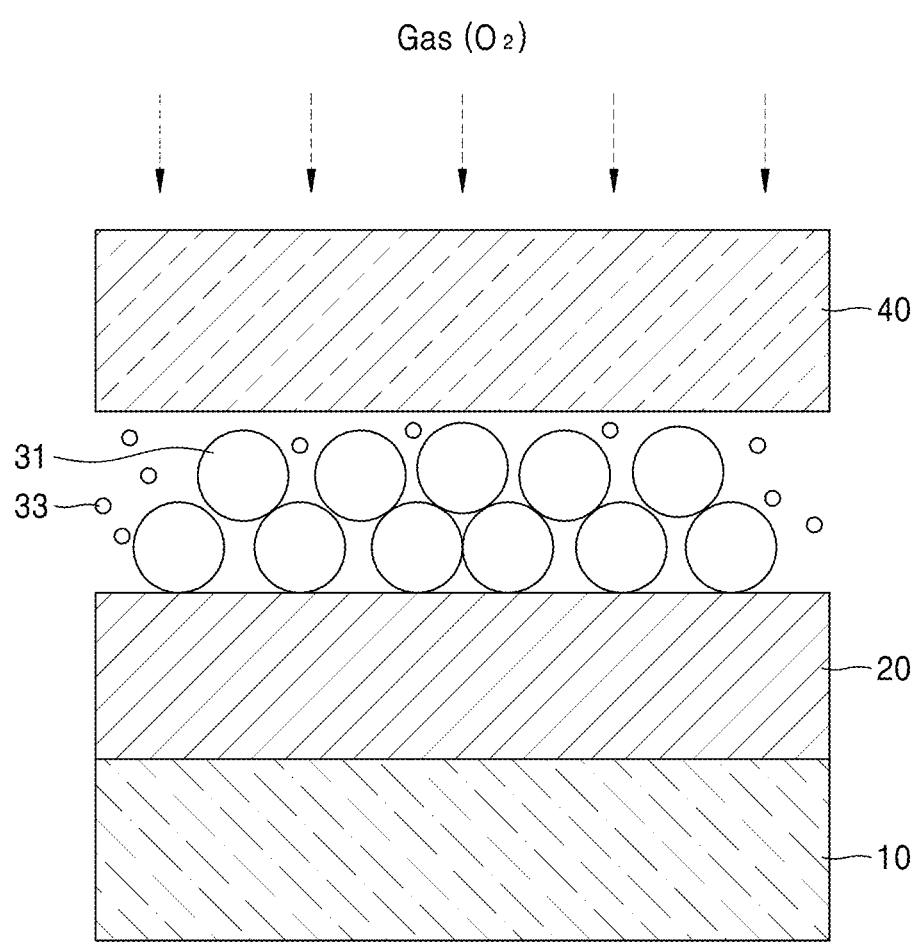

METAL-AIR BATTERY AND METHOD OF MANUFACTURING THE METAL-AIR BATTERY

CROSS-REFERENCE TO RELATED APPLICATION

This application claims priority to and the benefit of Korean Patent Application No. 10-2019-0157677, filed on Nov. 29, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to a secondary battery, and more particularly, to a metal-air battery.

2. Description of Related Art

A metal-air battery includes an anode capable of absorbing and releasing ions and a cathode that uses oxygen in the air as an active material. Reduction and oxidation reactions of oxygen occur in the cathode, and oxidation and reduction reactions of a metal occur in the anode. Chemical energy generated during the oxidation and reduction reactions of the metal is converted into electrical energy to then be extracted. For example, the metal-air battery absorbs oxygen during discharge and releases oxygen during charge. When the metal-air battery uses oxygen from air, a specific energy of the battery may be greatly increased. For example, the metal-air battery may have specific energy several times higher than an existing lithium ion battery.

In a metal-air battery, the cathode has an electron transport path and an ion transport path, and a capacity or performance of the metal-air battery may be significantly influenced by the cathode material and a configuration of the cathode or air electrode. The cathode material may be porous, e.g., have a void structure, and bonding between particles in the cathode may be weakened, resulting in deformation of the cathode material. Deformation of the cathode may cause reduced performance and a shortened life span in the metal-air battery. Thus there remains a need for improved metal-air battery materials.

SUMMARY

Provided is a metal-air battery having excellent charge and discharge characteristics.

Provided is a metal-air battery capable of preventing deformation of a cathode.

Additional aspects will be set forth in part in the description which follows and, in part, will be apparent from the description.

According to an aspect, a metal-air battery is provided, wherein the metal-air battery includes: an anode layer including a metal; a cathode layer including an electrically conductive metal oxide; a solid electrolyte layer between the anode layer and the cathode layer; and a bonding layer including a metal, wherein the bonding layer bonds the cathode layer to the solid electrolyte layer.

The bonding layer may include at least one of Pt, Au, Mn, Co, Ni, Cr, V, Fe, Pb, or Sn.

A thickness of the bonding layer may be about 10 nanometers (nm) or less.

The electrically conductive metal oxide may be at least one of $RuO_2$, InSnO, IrO, $OsO_2$, $RhO_2$, $Ce_xO_y$ wherein $0 \leq x \leq 2$ and $0 \leq y \leq 3$, $W_xO_y$ wherein $0 \leq x \leq 2$ and $0 \leq y \leq 3$, NbO, $Eu_2O_3$, $Ti_xO_y$ wherein $0 \leq x \leq 2$ and $0 \leq y \leq 3$, $Mn_2O_3$, or $PbO_2$.

The cathode layer may be porous.

A porosity of the cathode layer may be about 90 volume percent (vol %) or less, based on a total volume of the cathode layer.

A specific surface area of the cathode layer may be about 1 square meter per gram ($m^2/g$) or more, based on a total specific surface area of the cathode layer.

The solid electrolyte layer may include at least one compound having a NASICON structure, a garnet structure, or a perovskite structure.

The solid electrolyte layer may include at least one of $Li_{1+a}Al_aTi_{2-a}(PO_4)_3$ (LATP) wherein $0 \leq a \leq 1$, $Li_aLa_3Zr_2O_{12}$ (LLZO) wherein $5 \leq a \leq 9$, or $La_{0.55}Li_{0.35}TiO_3$ (LLTO).

The metal-air battery may further include a gas diffusion layer on at least one surface of the cathode layer.

The cathode layer may not include an organic electrolyte.

According to another aspect, there is provided a method of manufacturing a metal-air battery. The method includes: providing a solid electrolyte layer; coating a surface of the solid electrolyte layer with a bonding layer; disposing a metal oxide composite layer on a surface of the bonding layer; heat-treating the solid electrolyte layer, the bonding layer and the metal oxide composite layer; and disposing an anode layer on a surface of the solid electrolyte layer to manufacture the metal air battery.

The metal oxide composite layer may be in the shape of a plate.

The metal oxide composite layer may include an electrically conductive metal oxide and a binder.

The heat-treating may include heat-treating at a temperature of about 500° C. to about 800° C.

The heat-treating may bond the electrically conductive metal oxide to the bonding layer.

A melting point of the bonding layer may be between 230° C. and about 1910° C.

The bonding layer may include at least one of Pt, Au, Mn, Co, Ni, Cr, V, Fe, Pb, or Sn.

A thickness of the bonding layer may be about 10 nanometers (nm) or less.

The electrically conductive metal oxide may be at least one of $RuO_2$, InSnO, IrO, $OsO_2$, $RhO_2$, $Ce_xO_y$ wherein $0 \leq x \leq 2$ and $0 \leq y \leq 3$, $W_xO_y$ wherein $0 \leq x \leq 2$ and $0 \leq y \leq 3$, NbO, $Eu_2O_3$, $Ti_xO_y$ wherein $0 \leq x \leq 2$ and $0 \leq y \leq 3$, $Mn_2O_3$, or $PbO_2$.

The solid electrolyte layer may have at least one compound having a NASICON structure, a garnet structure, or a perovskite structure.

The solid electrolyte layer may include at least one of $Li_{1+a}Al_aTi_{2-a}(PO_4)_3$ (LATP) wherein $0 \leq a \leq 1$, $Li_aLa_3Zr_2O_{12}$ (LLZO) wherein $5 \leq a \leq 9$, or $La_{0.55}Li_{0.35}TiO_3$ (LLTO).

The method may further include disposing a gas diffusion layer on at least one surface of the cathode layer.

According to an aspect, a metal-air battery is provided, wherein the metal-air battery includes: an anode layer including a metal; a cathode layer, wherein a porosity of the cathode layer is greater than 0 percent by volume and less than or equal to about 90 percent by volume, based on a total volume of the cathode layer; a solid electrolyte layer between the anode layer and the cathode layer; and a bonding layer disposed between the cathode layer and the solid electrolyte layer, wherein the bonding layer comprises at least one of Pt, Au, Mn, Co, Ni, Cr, V, Fe, Pb or Sn.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a cross-sectional view illustrating a comparative example of a metal-air battery;

DETAILED DESCRIPTION

Figure 1:
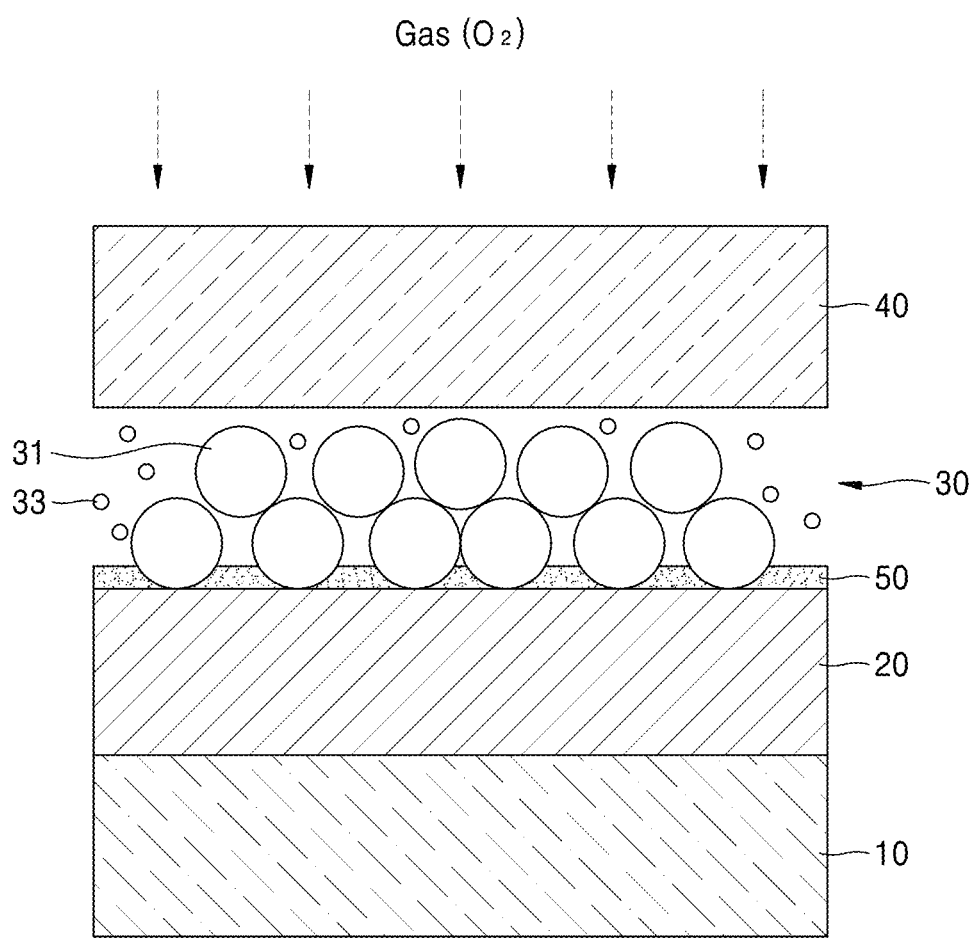
FIG. 1 is a cross-sectional view schematically illustrating an embodiment of a metal-air battery.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a metal-air battery according to an embodiment will be described in further detail with reference to the accompanying drawings. Widths and thicknesses of layers or regions illustrated in the accompanying drawings may be exaggerated for the sake of clarity. Like reference numerals refer to like elements throughout.

Figure 2:
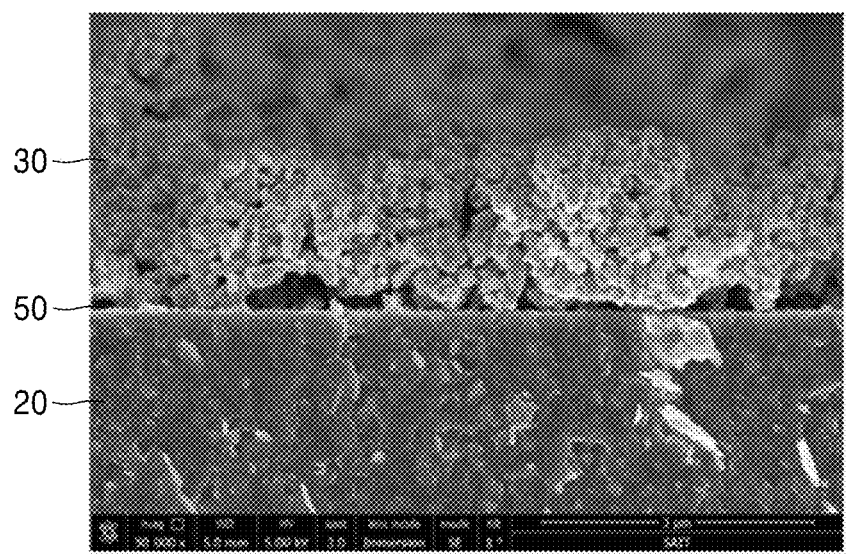
FIG. 2 is a SEM image of an embodiment of a cathode layer, a solid electrolyte layer, and a bonding layer.

FIG. 1 is a cross-sectional view schematically illustrating an embodiment of a metal-air battery. FIG. 2 is a SEM image of an embodiment of a cathode layer, a solid electrolyte layer, and a bonding layer.

Referring to FIG. 1, the metal-air battery comprises an anode layer 10 comprising a metal; and a cathode layer 30 spaced apart from the anode layer 10. The cathode layer 30 comprises an electronically conductive metal oxide 31. A solid electrolyte layer 20 is disposed between the anode layer 10 and the cathode layer 30. A bonding layer 50 that may bond the electrically conductive metal oxide 31 to the solid electrolyte layer 20, is disposed between the solid electrolyte layer 20 and the cathode layer 30. The cathode layer 30 comprises the electrically conductive metal oxide 31. The metal-air battery may further include a gas diffusion layer 40 in contact with at least one surface of the cathode layer 30. The gas diffusion layer 40 may supply oxygen ($O_2$) to the cathode layer 30. The cathode layer 30 may further comprise a cathode catalyst, and may be a "cathode catalyst layer." A cathode layer further comprising a catalyst may be referred to as a "cathode." The cathode layer 30 and the gas diffusion layer 40 may be configured as a "cathode portion." In an aspect, the cathode portion of the metal-air battery comprises the cathode layer 30, and optionally, may further include the gas diffusion layer 40.

The anode layer 10 may include a material capable of absorbing and releasing metal ions. The material may include, for example, lithium (Li), sodium (Na), zinc (Zn), potassium (K), calcium (Ca), magnesium (Mg), iron (Fe), aluminum (Al), or an alloy thereof. For example, the anode layer 10 may include lithium (Li). The anode layer 10 may include at least one of lithium, a lithium-based alloy, or a lithium intercalation compound. When the anode layer 10 includes lithium, the metal-air battery may be referred to as a "lithium-air battery".

The solid electrolyte layer 20 may include an inorganic material containing a lithium ion conductive glass, a crystalline lithium ion conductive ceramic or glass-ceramic, or a combination thereof. For example, the solid electrolyte layer 20 may include $Li_{1+a}Al_aTi_{2-a}(PO_4)_3$ (LATP) ($0 \leq a \leq 1$) having a NASICON structure, e.g., a material isostructural with NASICON, i.e., $Na_{1+x}Zr_2Si_xP_{3-x}O_{12}$, $0<x<3$. For example, in an aspect wherein the solid electrolyte layer 20 includes a material having a NASICON structure, although moisture may be present in the cathode layer 30 because an aqueous electrolyte material 33 is included in the cathode layer 30, and while not wanting to be bound by theory, it is understood that the moisture does not pass through the solid electrolyte layer 20, and thus, the solid electrolyte layer 20 may serve as a protective film that prevents the moisture included in the aqueous electrolyte material 33 from directly reacting with lithium included in the anode layer 10. In addition, and while not wanting to be bound by theory, it is understood that ionic conductivity of the solid electrolyte layer 20 that includes the material having the NASICON structure may be improved more than ion conductivity of the solid electrolyte layer 20 having another structure. The ion conductivity may also be improved when the solid electrolyte layer 20 includes a compound having a garnet structure, e.g., $Li_aLa_3Zr_2O_{12}$ (LLZO) ($5 \leq a \leq 9$), or having a perovskite structure, e.g., $La_{0.55}Li_{0.35}TiO_3$ (LLTO). In addition, the solid electrolyte layer 20 may also include a material having a layered rock salt crystal structure, or a material having an argyrodite crystal structure. In addition, the solid electrolyte layer 20 may further include a polymer solid electrolyte component, e.g., in addition to a glass-ceramic component. The polymer solid electrolyte may be a lithium salt-doped polyethylene oxide. The lithium salt may comprise at least one of $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, or $LiAlCl_4$. The cathode layer 30 may be an air electrode, and may be configured to use oxygen ($O_2$) in the air as an active material. For an electrochemical reaction of metal ions provided from the anode layer 10 and gas (e.g., oxygen from the air) provided to the cathode layer 30, the electrically conductive metal oxide 31 may provide a path for migration of electrons, e.g., electron transport, and the metal oxide 31 may comprise a material having suitable electronic conductivity. For example, the electrically conductive metal oxide 31 may be at least one of $RuO_2$, $InSnO$, $IrO$, $OsO_2$, $RhO_2$, $Ce_xO_y$ wherein $0 \leq x \leq 2$ and $0 \leq y \leq 3$, $W_xO_y$ wherein $0 \leq x \leq 2$ and $0 \leq y \leq 3$, $NbO$, $Eu_2O_3$, $Ti_xO_y$ wherein $0 \leq x \leq 2$ and $0 \leq y \leq 3$, $Mn_2O_3$, or $PbO_2$. The electrically conductive metal oxide may include other suitable materials.

The electrically conductive metal oxide may have an electronic conductivity of about $1.0 \times 10^{-6}$ Siemens per centimeter (S/cm) to about $1.0 \times 10^1$ S/cm, about $2.0 \times 10^{-6}$ S/cm to about $1.0 \times 10^1$ S/cm, about $2.0 * 10^{-6}$ S/cm to about $5.0$ S/cm, about $4.0 * 10^{-6}$ S/cm to about 5.0 S/cm, about $4.0 \times 10^{-6}$ S/cm to about 1.0 S/cm, about $5.0 \times 10^{-6}$ S/cm to about 1.0 S/cm, about $1.0 \times 10^{-5}$ S/cm to about 1.0 S/cm, about $2.0 \times 10^{-5}$ S/cm to about 1.0 S/cm, about $4.0 \times 10^{-5}$ S/cm to about 1.0 S/cm, about $5.0 \times 10^{-5}$ S/cm to about 1.0 S/cm, about $1.0 \times 10^{-4}$ S/cm to about 1.0 S/cm, about $2.0 \times 10^{-4}$ S/cm to about 1.0 S/cm, about $2.0 \times 10^{-4}$ S/cm to about $5.0 \times 10^{-1}$ S/cm, or about $2.0 \times 10^{-4}$ S/cm to about $1.0 \times 10^{-1}$ S/cm. The electronic conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation. The electronic conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation.

For example, the cathode layer 30 may further include an aqueous electrolyte material 33 that may provide suitable ion conductivity.

The electrolyte comprises a suitable salt, and may comprise at least one of an alkali metal, e.g., $Li^+$ or an alkaline earth metal. The alkali metal may be at least one of lithium (Li), sodium (Na), potassium (K), rubidium (Rb), cesium (Cs), or francium (Fr). The alkaline earth metal may be at least one of beryllium (Be), magnesium (Mg), calcium (Ca), strontium (Sr), barium (Ba), or radium (Ra).

The aqueous electrolyte material may comprise at least one of a mono- or polyprotic organic acid salt, a substituted carboxylic acid, a carboxylic acid derivative, a lactone, an ester of an inorganic acid, a sulfur containing organic acid, a phenol, an inorganic neutral or acid salt, an amphoteric hydroxide, an onium salt, a halide, a sulfide, a sulfate, a nitrate, or a carbonate of an alkali metal or alkaline earth metal. For example, the salt may comprise at least one of LiBr, LiCl, NaBr, NaCl, zinc nitrate, magnesium nitrate, lithium dihydrogen phosphate, or lithium hydrogen selenite. The aqueous electrolyte material 33 may be an aqueous solution including water vapor ($H_2O$) or water vapor ($H_2O$) and at least one of $Li_2SO_4$, $NH_4Cl$, LiCl, or lithium bis(pentafluoroethansulfonyl)imide (LiBETI).

A concentration of the salt in the aqueous electrolyte material may be about 0.01 molar (M) to about 1 M, for example, about 0.02 M to about 0.9 M, or about 0.04 M to about 0.7 M, or about 0.08 M to about 0.5 M.

As illustrated in FIG. 1, the aqueous electrolyte material 33 may be disposed on the bonding layer 50, and may be in the form of droplets comprising water and the salt. In an aspect, the cathode layer 30 may be an electrode that does not comprise an organic electrolyte, that is, may be an organic electrolyte-free electrode. An electrode can be determined to be an organic electrolyte-free electrode when an organic electrolyte cannot be detected when the electrolyte is analyzed by Fourier-transform infrared spectroscopy (FT-IR).

When the metal-air battery according to an embodiment is a lithium-air battery, the Electrochemical Reaction 1 may occur in the cathode portion during discharge.

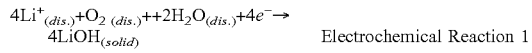

$$4Li^+_{(dis.)} + O_{2\ (dis.)} + 2H_2O_{(dis.)} + 4e^- \rightarrow 4LiOH_{(solid)}$$ Electrochemical Reaction 1

Lithium ions ($Li^+$) provided from the anode layer 10 and oxygen ($O_2$) provided from atmosphere (air) may combine (react) with electrons ($e^-$) on a surface of the cathode layer 30 to generate LiOH, which is a solid. The electrically conductive metal oxide 31 and the aqueous electrolyte material 33, which are included in the cathode layer 30, may provide for electron transport, e.g., a migration path for electrons ($e^-$), and ion transport, e.g., a migration path for lithium ions ($Li^+$). LiOH may be generated and is an example of a reaction product. During charge, the discharge reaction may be reversed.

In order for oxygen ($O_2$) provided from the atmosphere (air) to combine (react) with an electron ($e^-$) on the surface of the cathode layer 30, the cathode layer 30 according to an example may be configured to comprise an empty space, e.g., a pore or a void. Accordingly, the cathode layer 30 may include a void, e.g. an air gap or a pore. A plurality of voids may be randomly arranged in the cathode layer 30. The cathode layer 30 according to an embodiment may include the electrically conductive metal oxide 31, and the electrically conductive metal oxide 31 may include a plurality of particles as illustrated in FIG. 1. A plurality of voids may be randomly disposed between the plurality of particles of the electrically conductive metal oxide 31.

The void in the cathode layer 30 may be a space in which a reaction product is formed, and at the same time, may provide a path through which gas (oxygen) moves. When the void is not filled with an electrolyte and is left empty or is only partially filled, the gas (oxygen) may be supplied with improved homogeneity.

Because the reaction area of the battery increases as a porosity of the cathode layer 30 increases, a capacity may be increased and an energy density may be increased. The porosity of the cathode layer 30 may be, for example, about 90 volume percent (vol %) or less, based on total volume of the cathode layer. The porosity may be greater than 0 vol % to less than or equal to about 90 vol %, about 10 vol % to about 80 vol %, about 20 vol % to about 70 vol %, or about 30 vol % to about 60 vol %, based on total volume of the cathode layer. In addition, the reaction area of the battery increases as the specific surface area of the cathode layer 30 increases. When the reaction area of the battery increases, the capacity may be increased and the energy density may be increased. The specific surface area of the cathode layer 30 may be, for example, about 1 square meter per gram ($m^2/g$) or more. The specific surface area may be about 1 square meter per gram ($m^2/g$) to about 1000 $m^2/g$, about 1.5 $m^2/g$ to about 500 $m^2/g$, about 2 $m^2/g$ to about 100 $m^2/g$, about 5 $m^2/g$ to about 50 $m^2/g$, or about 7 $m^2/g$ to about 25 $m^2/g$. The specific surface area may be determined by using nitrogen isotherms. See, for example, E. P. Barrett, L. G. Joyner, P. P. Halenda, "The determination of pore volume and area distributions in porous substances. I. Computations from nitrogen isotherms," J. Am. Chem. Soc. (1951), 73, 373-380, the content of which is incorporated herein by reference in its entirety.

The cathode layer 30 may be porous, and the electrically conductive metal oxide 31 included in the cathode layer 30 may comprise a plurality of particles to form the void. When the electrically conductive metal oxide 31 is formed of the plurality of particles and the plurality of particles are combined together, a connection between the plurality of particles may be weak, and thereby, an electrode form of the cathode layer 30 may be difficult to maintain in the process of charge and discharge. Due to this weak connection, separation and peeling may occur between the cathode layer 30 and the solid electrolyte layer 20, which may weaken charge and discharge characteristics of the metal-air battery.

The bonding layer 50 is a bonding member that is disposed between the cathode layer 30 and the solid electrolyte layer 20 to bond the cathode layer 30 to the solid electrolyte layer 20. The bonding layer 50 may have a melting point lower than a melting point and/or sublimation point (e.g., at 1 atmosphere) of the electrically conductive metal oxide 31 included in the cathode layer 30. Accordingly, in the process of sintering the bonding layer 50 disposed between the solid electrolyte layer 20 and the electrically conductive metal oxide 31, only the bonding layer 50 may be melted, without a change, e.g., to the form or composition, of the electrically conductive metal oxide 31. In the process of cooling the molten bonding layer 50, the bonding layer 50 may bond the electrically conductive metal oxide 31 to the solid electrolyte layer 20, as illustrated in FIG. 2. A more detailed process of bonding the electrically conductive metal oxide 31 to the solid electrolyte layer 20 by using the bonding layer 50 is described with reference to FIGS. 3A to 3E.

The bonding layer 50 according to an example may include a material having electronic conductivity, for example, at least one of Pt, Au, Mn, Co, Ni, Cr, V, Fe, Pb, or Sn. In addition, a thickness of the bonding layer 50 according to an example may be about 10 nm or less, and thus, the specific surface area may be increased. As is further described above, a portion of the electrically conductive metal oxide 31 may be disposed to be in contact with the bonding layer 50, and the gas diffusion layer 40 may be disposed on the other surface of the cathode layer comprising the electrically conductive metal oxide 31.

The gas diffusion layer 40 may absorb oxygen and carbon dioxide in the atmosphere and provide the same to the cathode layer 30. The gas diffusion layer 40 may have a porous structure to smoothly diffuse oxygen and carbon dioxide. For example, the gas diffusion layer 40 may comprise at least one of carbon paper, carbon cloth, carbon felt including carbon fiber, sponge-like foam metal, or a metal fiber mat. In addition, the gas diffusion layer 40 may comprise a flexible porous material, which is not conductive, such as a nonwoven fabric. The cathode layer 30 may have a porous structure or other suitable structure and may perform as the gas diffusion layer and the cathode layer. The gas diffusion layer 40 may be omitted if desired.

Although not illustrated in FIG. 1, an anode current collector in contact with the anode layer 10 may be further provided. The anode current collector may be provided on a bottom surface of the anode layer 10. Accordingly, the anode layer 10 may be disposed between the anode current collector and the solid electrolyte layer 20. The anode current collector may include, for example, copper (Cu), stainless steel (SUS), silver (Ag), magnesium (Mg), or other suitable conductor. In addition, a cathode current collector in contact with the gas diffusion layer 40 may be further provided. A cathode current collector may be provided on an upper surface of the gas diffusion layer 40. Accordingly, the gas diffusion layer 40 may be disposed between the cathode current collector and the cathode layer 30. The cathode current collector may include, for example, stainless steel (SUS) or a porous carbon material. When the cathode current collector includes SUS, the SUS may have a mesh structure for permeation of air (gas). The material of the cathode current collector is not limited to SUS, and may be another suitable material, e.g., aluminum. When the gas diffusion layer 40 is not used, the cathode current collector may be in contact with the cathode layer 30. The anode portion may comprise the anode current collector, and similarly, the cathode portion may comprise the cathode current collector.

FIGS. 3A to 3E are cross-sectional views schematically illustrating an embodiment of a method of manufacturing the metal-air battery.

Figure 3A:
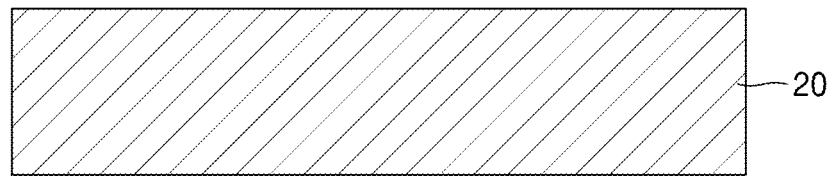
FIGS. 3A to 3E are cross-sectional views schematically illustrating an embodiment of a method of manufacturing a metal-air battery.

Referring to FIG. 3A, according to an embodiment, the solid electrolyte layer 20 may be provided. For example, the solid electrolyte layer 20 may be provided in a flat plate shape, e.g., in the form of a film or layer. In addition, the solid electrolyte layer 20 may comprise at least one of a compound having a NASICON structure, e.g., $Li_{1+a}Al_aTi_{2-a}(PO_4)_3$ (LATP) ($0 \leq a \leq 1$), a compound having a garnet structure, e.g., $Li_aLa_3Zr_2O_{12}$ (LLZO) ($5 \leq a \leq 9$), or a compound having a perovskite structure, e.g., $La_{0.55}Li_{0.35}TiO_3$ (LLTO).

Figure 3B:
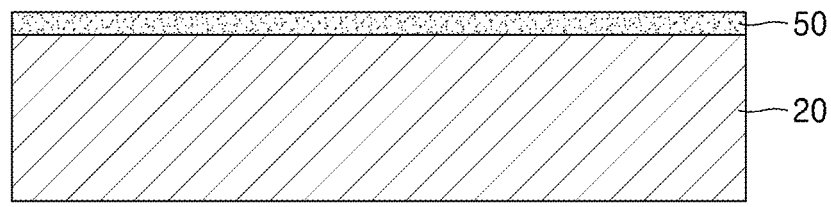

Referring to FIG. 3B, according to an embodiment, an upper surface of the solid electrolyte layer 20 may be coated with the bonding layer 50. For example, the upper surface of the solid electrolyte layer 20 may be coated with the bonding layer 50 by using a sputtering method. At this time, the bonding layer 50 may include at least one of Pt, Au, Mn, Co, Ni, Cr, V, Fe, Pb, or Sn.

Figure 3C:
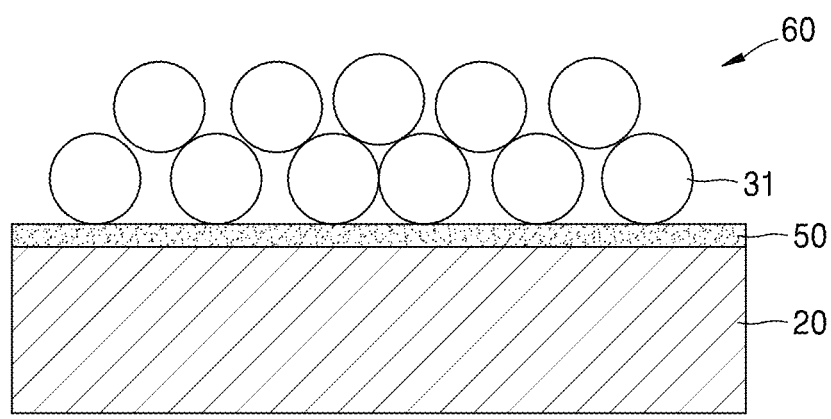

Referring to FIG. 3C, a metal oxide composite layer 60 including the electrically conductive metal oxide 31 may be disposed on an upper surface of the bonding layer 50. For example, the electrically conductive metal oxide composite layer 60 may be formed in a thin plate shape, e.g., as a layer, and include the electrically conductive metal oxide 31 and a binder (not illustrated). For example, the metal oxide composite layer 60 may be a product of coating a mixture comprising the electrically conductive metal oxide 31. The mixture comprising the electrically conductive metal oxide may be formed by mixing and grinding the electrically conductive metal oxide 31 and the binder (not illustrated), for example, ruthenium oxide ($RuO_2$) and 30 weight percent (wt %) polyvinyl butyral for approximately 1 hour using a mixer, and thereafter, the electrically conductive metal oxide 31 and binder slurry may be bar-coated and dried to provide the metal oxide composite layer 60 having a thin plate shape.

According to an embodiment, the metal oxide composite layer 60 may be disposed on an upper surface of the bonding layer 50. The metal oxide composite layer 60 may be supported by the bonding layer 50 by using a material capable of applying a predetermined force, for example, ethyl alcohol.

Figure 3D:
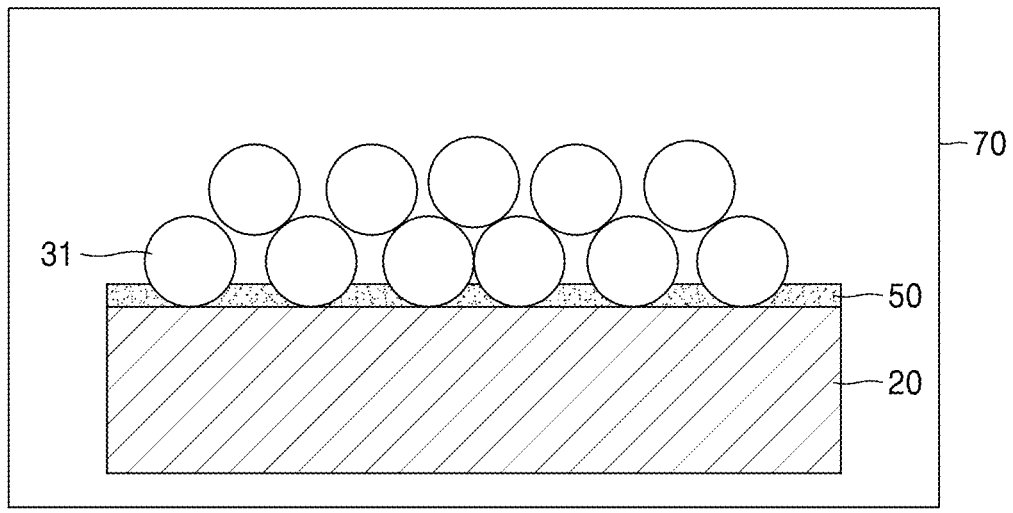

Referring to FIG. 3D, the solid electrolyte layer 20, the bonding layer 50, and the metal oxide composite layer 60 may be heat-treated at a predetermined temperature. For example, a composite of the solid electrolyte layer 20, the bonding layer 50, and the metal oxide composite layer 60 may be disposed in a furnace 70, which may be heat-treated at a predetermined temperature. The composite of the solid electrolyte layer 20, the bonding layer 50, and the metal oxide composite layer 60 may have a temperature lower than a predetermined temperature, for example, a melting point and/or sublimation point (at 1 atmosphere) of the electrically conductive metal oxide 31 included in the metal oxide composite layer 60, and may be heat to a temperature higher than the melting point of the material included in the bonding layer 50. For example, an internal temperature of the furnace 70 may be about 500° C. to about 800° C., and the temperature range is not limited thereto. The temperature of the heat-treatment may be about 525° C. to about 775° C., about 550° C. to about 750° C., about 575° C. to about 725° C., or about 600° C. to about 700° C. The heat-treatment may be for a predetermined amount of time, e.g. for about 1 hour to about 24 hours, for about 2 hours to about 20 hours, for about 4 hours to about 16 hours, or for about 6 hours to about 12 hours.

When the composite of the solid electrolyte layer 20, the bonding layer 50, and the metal oxide composite layer 60 is heat-treated, a binder (not illustrated) included in the metal oxide composite layer 60 may be removed. In addition, a material included in the bonding layer 50 may be melted. In an aspect, because the melting point and/or sublimation point (at 1 atmosphere) of the electrically conductive metal oxide 31 may be greater than the melting point of the bonding layer 50, the metal oxide 31 may not be melted. As the bonding layer 50 is melted, a portion of the electrically conductive metal oxide 31 included in the metal oxide composite layer 60 is buried into the bonding layers 50, and thus, the bonding layer 50 may bond the electrically conductive metal oxide 31 to the solid electrolyte layer 20.

Figure 3E:
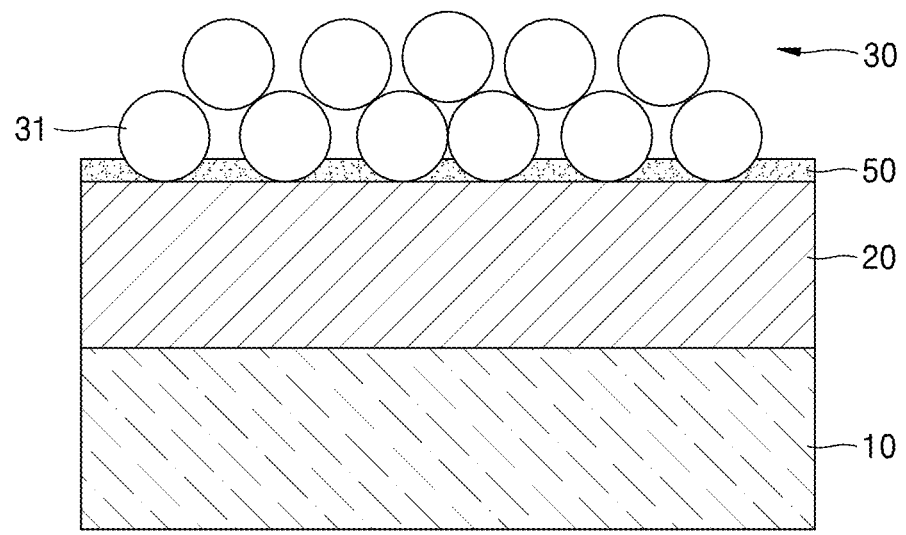

Referring to FIG. 3E, the anode layer 10 may be disposed on a lower surface of the solid electrolyte layer 20. For example, the anode layer 10 may be a lithium metal layer, but the anode layer is not limited thereto, and any other suitable anode material may be used.

Figure 5A:
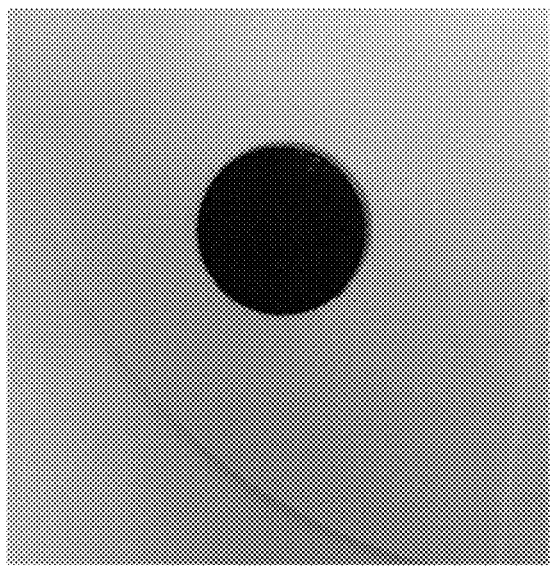
FIG. 5A is an SEM image of an embodiment of a cathode.
Figure 5B:
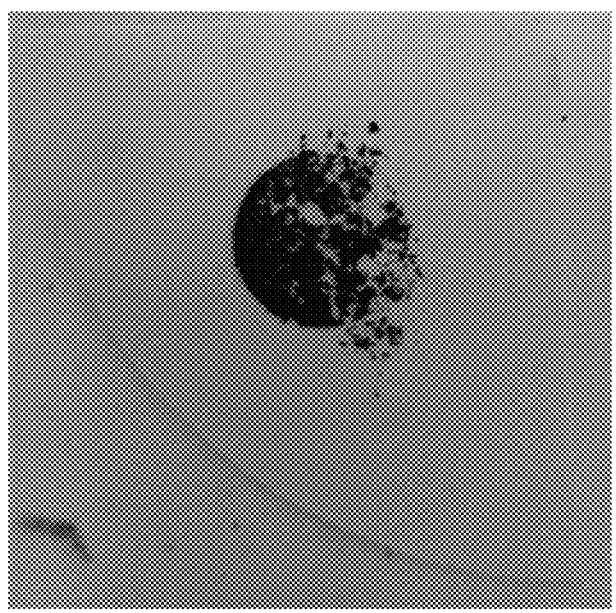
FIG. 5B is a SEM image of a comparative example of a cathode.

FIG. 4 is a cross-sectional view illustrating a comparative example of the metal-air battery. FIG. 5A is an SEM image of an embodiment of the cathode. FIG. 5B is an SEM image of a comparative example of the cathode.

Referring to FIG. 4, a metal-air battery according to the comparative example may include the anode layer 10 including a metal and the cathode layer 30 spaced apart from the anode layer 10. The cathode layer 30 may include the electrically conductive metal oxide 31. The solid electrolyte layer 20 may be disposed between the anode layer 10 and the cathode layer 30. The metal-air battery may further include the gas diffusion layer 40 in contact with at least one surface of the cathode layer 30. The metal-air battery according to the comparative example as illustrated in FIG. 4 does not include a bonding layer 50 capable of bonding the electrically conductive metal oxide 31 to the solid electrolyte layer 20.

In the metal-air battery according to an embodiment, the solid electrolyte layer 20 may comprise, e.g. an LATP material, and an electrically conductive metal oxide 31, e.g., ruthenium oxide ($RuO_2$), e.g., in the form of nano powder, may be disposed on an upper portion of the solid electrolyte layer 20. When the electrically conductive metal oxide 31 is ruthenium oxide ($RuO_2$), the amount of electrode loading may increase to about 0.8 milligrams per square centimeter ($mg/cm^2$). Platinum (Pt) may be coated on the upper surface of the solid electrolyte layer 20 at a predetermined thickness, for example, a thickness of about 7 nanometers (nm) as the bonding layer 50. When the electrically conductive metal oxide 31 and the bonding layer 50 described above are sintered at about 800° C. for about 4 hours, an electrode comprising the electrically conductive metal oxide 31 may be maintained as illustrated in FIG. 5A. In a metal-air battery, comprising this electrode, electrical conductivity may be increased, and the charge and discharge characteristics may also be improved.

In the metal-air battery according to a comparative example, the solid electrolyte layer 20 may include, e.g. an LATP material, and an electrically conductive metal oxide 31, e.g. ruthenium oxide ($RuO_2$) in the form of nano powder, disposed on an upper portion of the solid electrolyte layer 20. When the electrically conductive metal oxide 31 is ruthenium oxide ($RuO_2$) the amount of electrode loading may increase to about 0.8 $mg/cm^2$. However, when a separate bonding layer is not disposed between the solid electrolyte layer 20 and the electrically conductive metal oxide 31, the electrode formed from the electrically conductive metal oxide 31 may be damaged, as illustrated in FIG. 5B. In the comparative example, a metal-air battery comprising an electrode formed without a separate bonding layer has decreased electrical conductivity, and reduced charge and discharge capability.

Figure 6A:
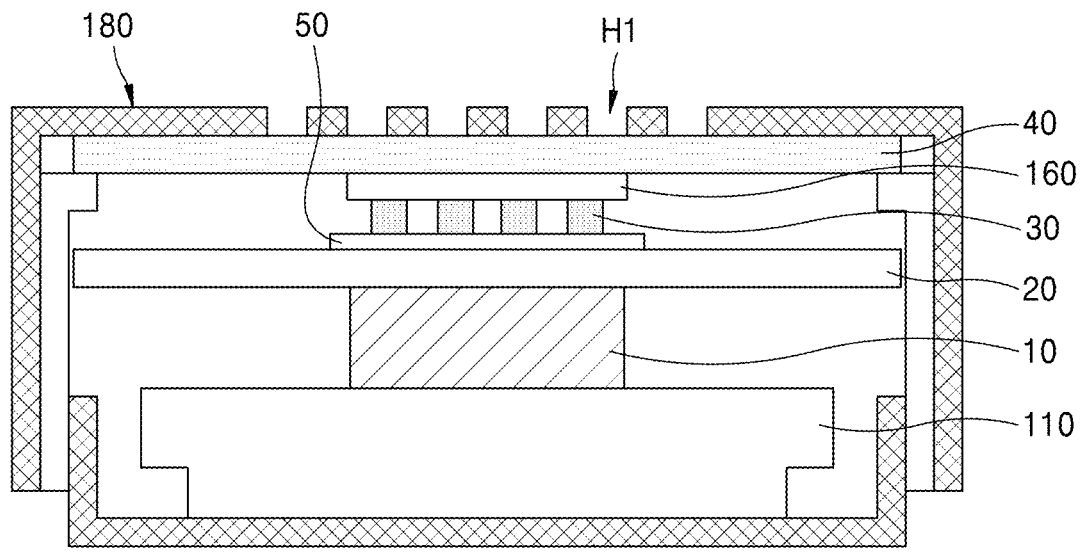
FIG. 6A is a cross-sectional view schematically illustrating an embodiment of a configuration of a metal-air battery.
Figure 6B:
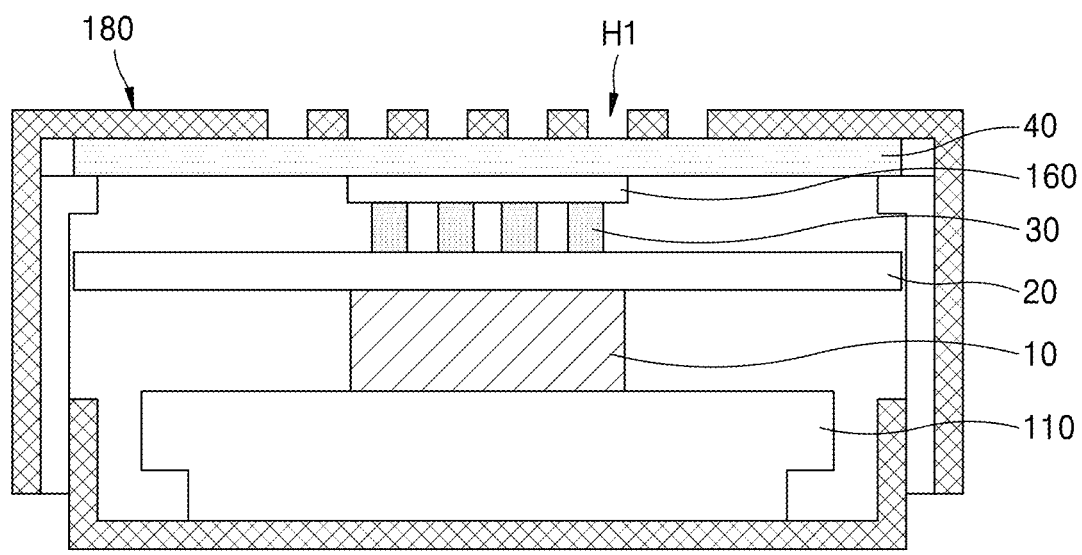
FIG. 6B is a cross-sectional view schematically illustrating a comparative example of a configuration of a metal-air battery.

FIG. 6A is a cross-sectional view illustrating an embodiment of a configuration of a metal-air battery. FIG. 6B is a cross-sectional view illustrating a comparative example of a configuration of a metal-air battery. The configuration may be an experimental structure for evaluating performance of the metal-air battery.

Referring to FIGS. 6A and 6B, the metal-air battery, according to an embodiment and a comparative example, is in the form of a coin cell. Elements of the battery may be provided in a case 180 having a plurality of open regions H1. A support structure 110 may be provided on a lower surface of the case 180. The support structure 110 may include, for example, a spacer and a spring member. The anode layer 10 comprising a metal may be provided on the support structure 110. The solid electrolyte layer 20 may be provided on the anode layer 10.

In an embodiment, the bonding layer 50 may be disposed on an upper portion of the solid electrolyte layer 20. The cathode layer 30 comprising the electrically conductive metal oxide 31 may be disposed on an upper portion of the bonding layer 50. In a comparative example, as illustrated in FIG. 6B, the bonding layer 50 is not disposed between the solid electrolyte layer 20 and the cathode layer 30.

The cathode layer 30 in an embodiment and in a comparative example may have a structure including a plurality of voids. An electrically conductive material layer (hereinafter "conductive layer") 160 may be provided on the cathode layer 30, and a gas diffusion layer 40 may be provided on the conductive layer 160. The gas diffusion layer 40 may be disposed adjacent to the plurality of opening regions H1 to supply external air to the cathode layer 30.

As an example, the anode layer 10 may include Li, and the solid electrolyte layer 20 may include lithium aluminum titanium phosphate (LATP), which is a solid electrolyte. The LATP may be $Li_{1+x}Al_xTi_{2-x}(PO_4)_3$, where x may be about 0.3. The cathode layer 30 may include ruthenium oxide ($RuO_2$) as the electrically conductive metal oxide 31. The conductive layer 160 may include at least one of Au, Ag, Pd, or Pt, for example. A bonding layer comprising platinum (Pt) may be disposed between the cathode layer 30 and the solid electrolyte layer 20.

The metal-air battery described in FIGS. 6A and 6B, were analyzed to confirm whether or not oxygen ($O_2$) in the atmosphere is reduced/oxidized on a surface of the cathode layer 30. In the analysis, characteristics were evaluated in oxygen ($O_2$) atmosphere and in a water vapor ($H_2O$) atmosphere. Here, water vapor ($H_2O$) may be used to provide water to the aqueous electrolyte material. The cycling characteristics of the metal-air battery according to an example and according to a comparative example were evaluated by repeatedly performing charge and discharge cycles on the metal-air batteries.

Figure 7:
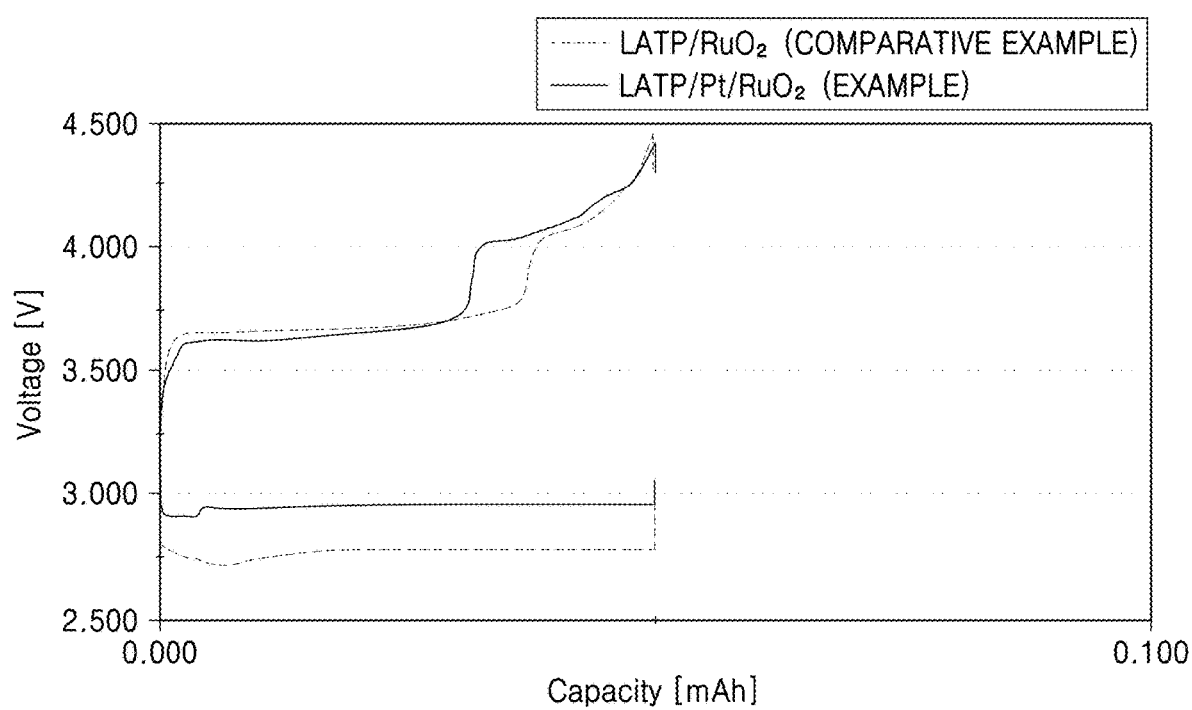
FIGS. 7, 8A, and 8B are each a graph of voltage (Volts, V) vs capacity (milliampere hours, mAh) illustrating charge and discharge simulation results for an Example and a Comparative Example metal-air batteries.
Figure 8A:
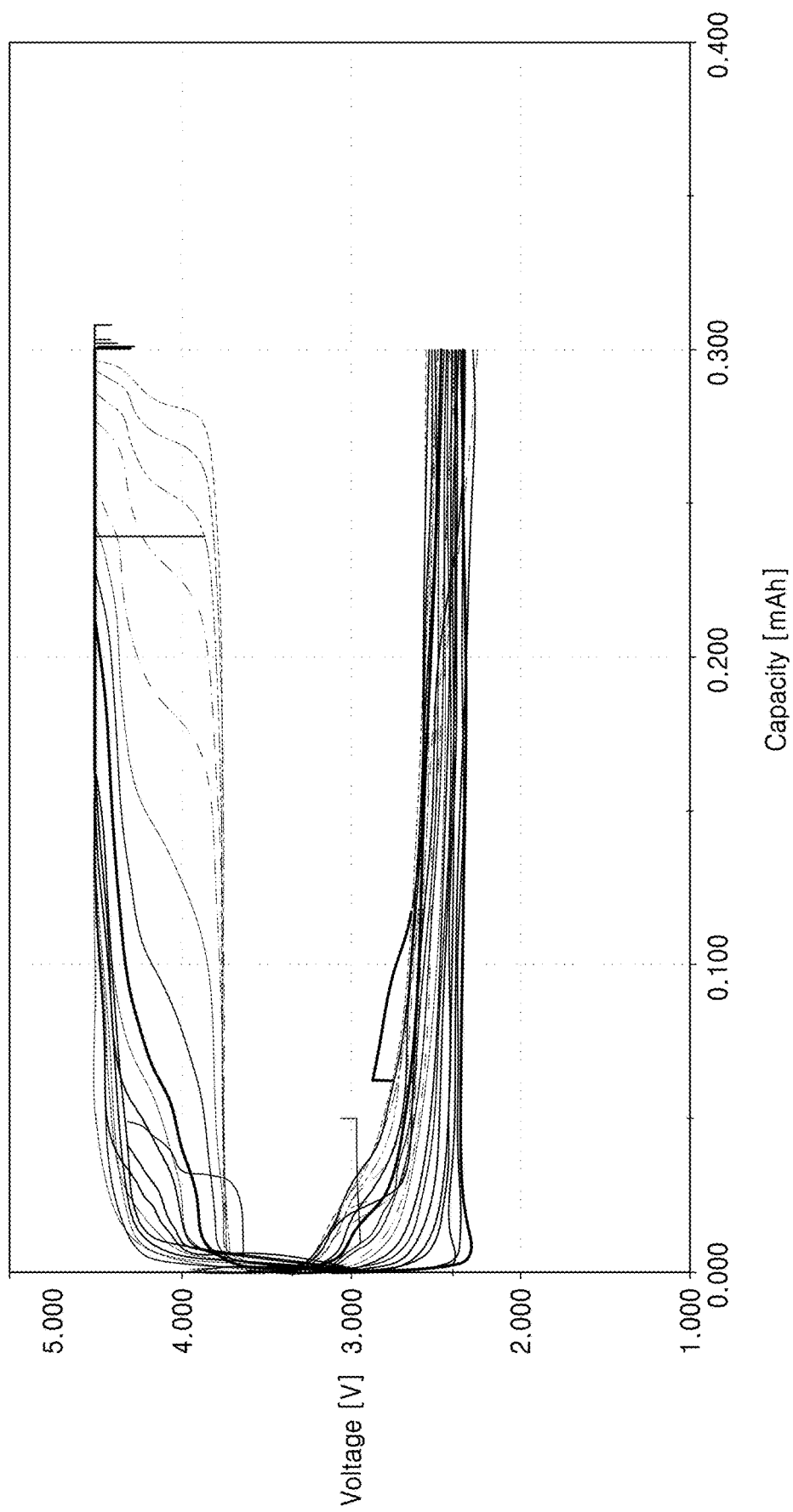
Figure 8B:
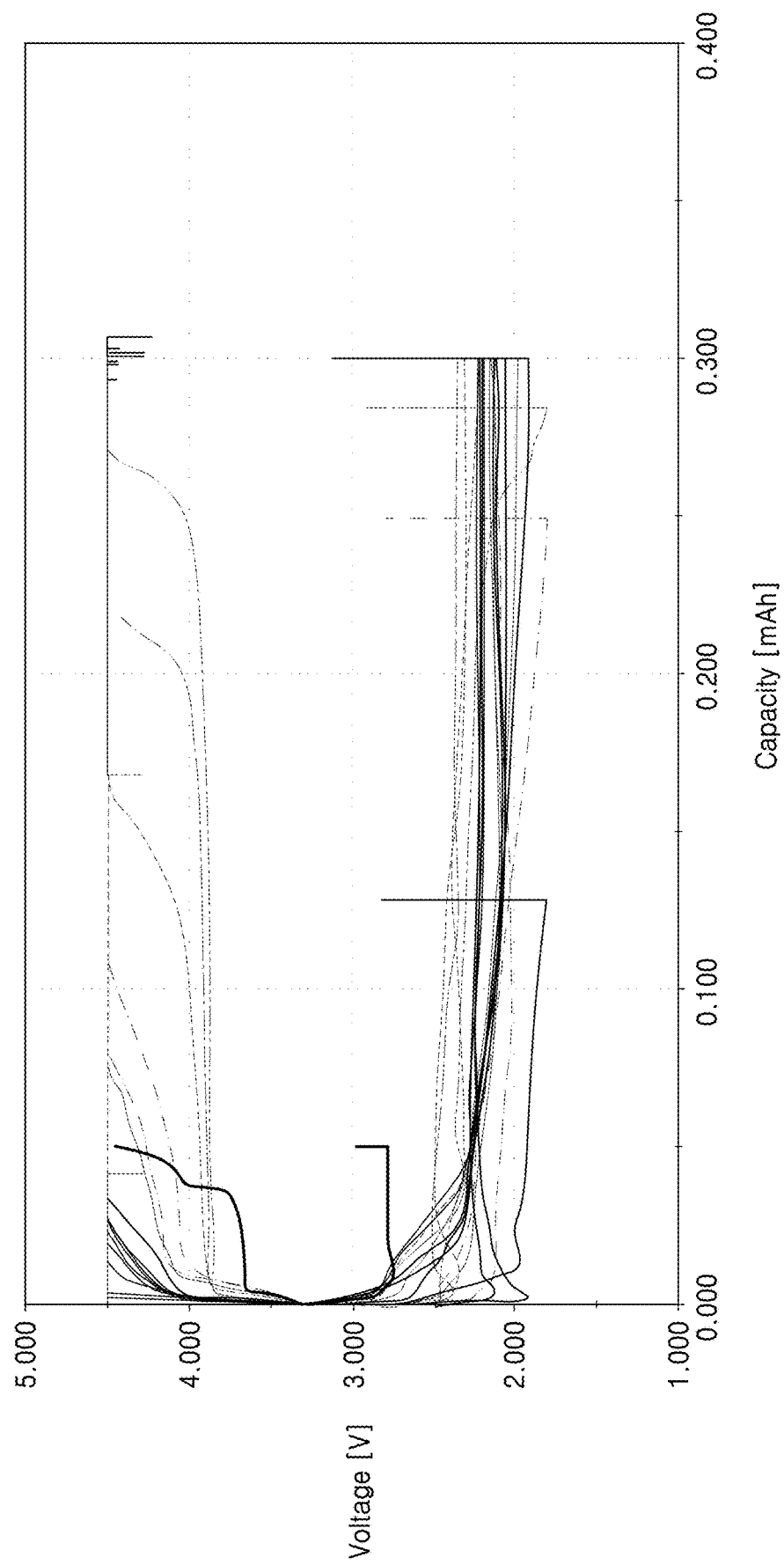
Figure 9:
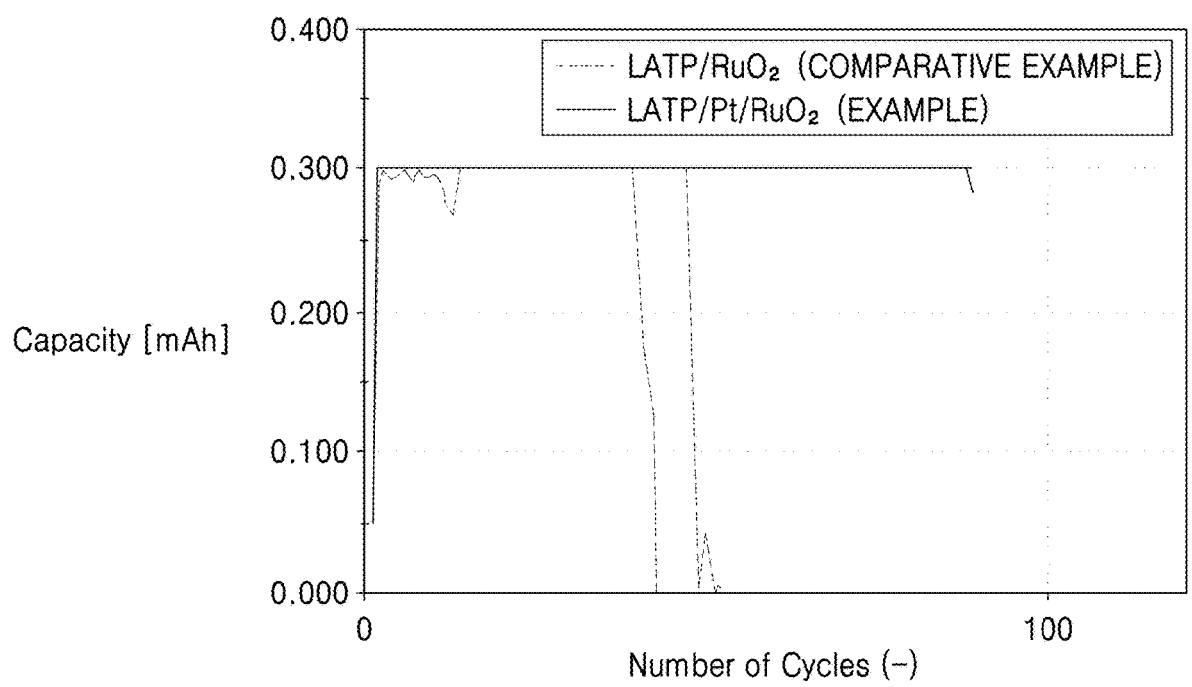
FIG. 9 is a graph of capacity (mAh) versus number of charge and discharge cycles for the Example and the Comparative Example.

FIGS. 7, 8A, and 8B are graphs, according to an example and a comparative example, illustrating voltage (V) versus charge capacity (milliampere hours, mAh) for metal-air batteries. FIG. 9 is a graph, according to an example and a comparative example, illustrating capacity (mAh) versus number of charge and discharge cycles (–).

The graphs of FIGS. 7 to 9 are graphs, according to an example and a comparative example, obtained using a COMSOL analysis program. COMSOL Multiphysics is a cross-platform finite element analysis, solver and multiphysics simulation software. The analysis used to generate the graphs shown in FIGS. 7 to 9 assumed for the Example that the bonding layer 50 is disposed between the solid electrolyte layer 20 and the cathode layer 30, and assume, for the Comparative Example, that the bonding layer 50 is not disposed between the solid electrolyte layer 20 and the cathode layer 30.

Referring to FIG. 7, when the metal-air battery, according to an example and a comparative example, were charged and discharged once to 0.3 mAh at 0.02 $mA/cm^2$. In an example in which the bonding layer 50 is disposed between the solid electrolyte layer 20 and the cathode layer 30, the discharge potential is 2.9 V, while in the Comparative Example in which the bonding layer 50 is not disposed between the solid electrolyte layer 20 and the cathode layer 30, the discharge potential is reduced to 2.75 V.

Referring to FIGS. 8A and 8B, the capacity of a metal-air battery, according to an example and a comparative example, are illustrated after a plurality of charge and discharge cycles. In the example in which the bonding layer 50 is disposed between the solid electrolyte layer 20 and the cathode layer 30, a uniform potential is provided throughout the charge and discharge cycles, while in the comparative example in which the bonding layer is not disposed between the solid electrolyte layer 20 and the cathode layer 30, an overvoltage continuously increases.

Referring to FIG. 9, the capacity of a metal-air battery, according to an example and a comparative example, is illustrated after a plurality of charge and discharge cycles up to a predetermined discharge voltage. In an example in which the bonding layer 50 is disposed between the solid electrolyte layer 20 and the cathode layer 30, it may be confirmed that the charge and discharge are performed with a uniform discharge potential up to a total of 89 times, while in the Comparative Example in which the bonding layer 50 is not disposed between the solid electrolyte layer 20 and the cathode layer 30, it may be confirmed that the charge and discharge are performed up to 52 times.

In an example in which the bonding layer 50 is disposed between the solid electrolyte layer 20 and the cathode layer 30, overvoltage may be reduced and reproducibility and charge capacity may be improved.

PROPHETIC EXAMPLES

Prophetic Comparative Example: Metal-Air Battery without Bonding Layer

A metal-air battery will be prepared using $Li_{1.3}Al_{0.3}Ti_{1.7}(PO_4)_3$ as a solid electrolyte layer. A metal oxide composite layer will be formed by mixing and grinding ruthenium oxide ($RuO_2$) and polyvinyl butyral (30 wt %), for approximately 1 hour using a mixer, and thereafter, the slurry will be bar-coated and dried to form a metal oxide composite layer. The metal oxide composite layer will be disposed on an upper portion of the solid electrolyte layer to provide a cathode in the battery. The electrode loading will be about 0.8 mg/cm². The cathode in the battery will be damaged during charge and discharge cycles.

Prophetic Example: Metal-Air Battery Including a Bonding Layer

A metal air-battery will prepared in the same manner as the Comparative Example, except that a separate bonding layer will be disposed between the solid electrolyte layer and the metal oxide composite layer. 7 nm of platinum will be coated on the upper surface of the solid electrolyte layer as the bonding layer. The metal oxide composite layer ($RuO_2$) and the bonding layer will be sintered at 800° C. for 4 hours. The electrode loading will be about 0.8 mg/cm².

Without wishing to be bound by theory, it is understood that the efficiency of a metal-air battery may be improved when the bonding layer 50 is disposed between the solid electrolyte layer 20 and the cathode layer 30, because damage of the cathode layer 30 is reduced, and electrical conductivity is increased between the electrically conductive metal oxides 31 included in the cathode layer 30, which reduces an overpotential effect. Accordingly, the cathode of the metal-air battery according to an example in which the bonding layer 50 is disposed between the solid electrolyte layer 20 and the cathode layer 30 may improve performance and extend the life of the battery.

While many aspects are specifically described in the foregoing description, the aspects should be construed as illustration of a specific embodiment rather than to limit the scope. For example, those skilled in the art will appreciate that a structure of a metal-air battery according to an embodiment may be modified. Therefore, the scope should not be limited by the disclosed embodiment.

According to an embodiment, a metal-air battery has excellent performance. According to an embodiment, a metal-air battery has excellent charge and discharge characteristics. According to an embodiment, deformation of a cathode in a metal air battery may be prevented when a bonding layer is disposed between an electrically conductive metal oxide and a solid electrolyte.

It should be understood that the embodiment described herein should be considered in a descriptive sense only and not for purposes of limitation. Descriptions of features, aspects, or advantages within each embodiment should be considered as available for other similar features, aspects, or advantages in other embodiments. While an embodiment has been described with reference to the figures, it will be understood by those of ordinary skill in the art that various changes in form and details may be made therein without departing from the spirit and scope as defined by the following claims.

What is claimed is:

1. A metal-air battery comprising:
    an anode layer comprising a metal;
    a cathode layer comprising an electrically conductive metal oxide;
    a solid electrolyte layer between the anode layer and the cathode layer; and
    a bonding layer having a melting point lower than a melting point of the electrically conductive metal oxide, disposed between the cathode layer and the solid electrolyte layer, and bonding the cathode layer to the solid electrolyte layer,
    wherein the bonding layer comprises at least one of Pt, Au, Mn, Co, Ni, Cr, V, Fe, Pb, or Sn, and
    wherein a thickness of the bonding layer is about 10 nanometers or less.

2. The metal-air battery of claim 1, wherein the electrically conductive metal oxide is at least one of $RuO_2$, indium tin oxide, $IrO_2$, $OsO_2$, $RhO_2$, $Ce_xO_y$, wherein $0<x\leq2$ and $0<y\leq3$, $W_xO_y$, wherein $0<x\leq2$ and $0<y\leq3$, NbO, $Eu_2O_3$, $Ti_xO_y$, wherein $0<x\leq2$ and $0<y\leq3$, $Mn_2O_3$, or $PbO_2$.

3. The metal-air battery of claim 1, wherein the cathode layer is porous.

4. The metal-air battery of claim 3, wherein a porosity of the cathode layer is about 90 volume percent or less, based on a total volume of the cathode layer.

5. The metal-air battery of claim 3, wherein a specific surface area of the cathode layer is about 1 square meter per gram or more, based on a total specific surface area of the cathode layer.

6. The metal-air battery of claim 1, wherein the solid electrolyte layer comprises at least one compound having a NASICON structure, a garnet structure, or a perovskite structure.

7. The metal-air battery of claim 6, wherein the compound is at least one of $Li_{1+a}Al_aTi_{2-a}(PO_4)_3$ wherein $0\leq a\leq 1$, $Li_aLa_3Zr_2O_{12}$ wherein $5\leq a\leq 9$, or $La_{0.55}Li_{0.35}TiO_3$.

8. The metal-air battery of claim 1, further comprising:
    a gas diffusion layer on at least one surface of the cathode layer.

9. The metal-air battery of claim 1, wherein the cathode layer does not comprise an organic electrolyte.

10. A method of manufacturing a metal-air battery of claim 1, the method comprising:
    providing the solid electrolyte layer;
    coating a surface of the solid electrolyte layer with the bonding layer;
    disposing the cathode layer comprising the electrically conductive metal oxide on a surface of the bonding layer;
    heat-treating the solid electrolyte layer comprising the bonding layer and the cathode layer; and
    disposing the anode layer comprising the metal on a surface of the solid electrolyte layer to manufacture the metal-air battery.

11. The method of claim 10, wherein the cathode layer comprises the electrically conductive metal oxide and a binder.

12. The method of claim 11, wherein the heat-treating comprises heat-treating at a temperature of about 500° C. to about 800° C.

13. The method of claim 12, wherein, the heat-treating bonds the electrically conductive metal oxide to the bonding layer.

14. The method of claim 10, wherein the cathode layer is in the shape of a plate.

15. The method of claim 10, wherein the electrically conductive metal oxide comprises at least one of $RuO_2$, InSnO, IrO, $OsO_2$, $RhO_2$, $Ce_xO_y$ wherein $0 \leq x \leq 2$ and $0 \leq y \leq 3$, $W_xO_y$ wherein $0 \leq x \leq 2$ and $0 \leq y \leq 3$, NbO, $Eu_2O_3$, $Ti_xO_y$ wherein $0 \leq x \leq 2$ and $0 \leq y \leq 3$, $Mn_2O_3$, or $PbO_2$.

16. The method of claim 10, wherein the solid electrolyte layer comprises at least one compound having a NASICON structure, a garnet structure, or a perovskite structure.

17. The method of claim 16, wherein the compound is at least one of $Li_{1+a}Al_aTi_{2-a}(PO_4)_3$ wherein $0 \leq a \leq 1$, $Li_aLa_3Zr_2O_{12}$ wherein $5 \leq a \leq 9$, or $La_{0.55}Li_{0.35}TiO_3$.

18. The method of claim 10, further comprising:
    disposing a gas diffusion layer on at least one surface of the cathode layer.

\* \* \* \* \*